United States Patent [19]
Grimonprez et al.

[11] Patent Number: 5,473,690
[45] Date of Patent: Dec. 5, 1995

[54] SECURED METHOD FOR LOADING A PLURALITY OF APPLICATIONS INTO A MICROPROCESSOR MEMORY CARD

[75] Inventors: Georges Grimonprez; Pierre Paradinas, both of Villeneuve d'Asq, France

[73] Assignee: Gemplus Card International, Gemenos, France

[21] Appl. No.: 90,039

[22] PCT Filed: Jan. 16, 1992

[86] PCT No.: PCT/FR92/00039

§ 371 Date: Oct. 25, 1993

§ 102(e) Date: Oct. 25, 1993

[87] PCT Pub. No.: WO92/13322

PCT Pub. Date: Aug. 6, 1992

[30] Foreign Application Priority Data

Jan. 18, 1991 [FR] France ................... 91 00560

[51] Int. Cl.⁶ ................... H04L 9/32; G07F 7/10
[52] U.S. Cl. ................... 380/24; 235/380; 902/2
[58] Field of Search ................... 380/24; 235/380; 902/2

[56] References Cited

U.S. PATENT DOCUMENTS

| | | | |
|---|---|---|---|
| 4,829,169 | 5/1989 | Watanabe | 235/380 |
| 4,849,614 | 7/1989 | Watanabe et al. | 235/380 X |
| 4,928,001 | 5/1990 | Masada | 235/380 |
| 4,985,615 | 1/1991 | Iijima | 235/380 |
| 5,161,256 | 11/1992 | Iijima | 235/382 X |

FOREIGN PATENT DOCUMENTS

| | | |
|---|---|---|
| 0152024 | 8/1985 | European Pat. Off. |
| 0218176 | 4/1987 | European Pat. Off. |
| 0262025 | 3/1988 | European Pat. Off. |
| WO88/09019 | 11/1988 | European Pat. Off. |
| WO87/07060 | 11/1987 | WIPO |
| WO87/07061 | 11/1987 | WIPO |
| 0261030 | 3/1988 | WIPO |

Primary Examiner—Gilberto Barrón, Jr.
Attorney, Agent, or Firm—Nilles & Nilles

[57] ABSTRACT

A method for loading and managing a plurality of applications in a memory of a chip card, the method including: recording a chart of applications in the memory of the chip card which associates a password and a memory space with a name for i) each of the plurality of applications and ii) at least one user application on that application; recording a chart of data tables in the memory of the chip card, the chart of data tables including a plurality of records, each of the plurality of records associating a name for each of the plurality of applications with a name for at least one data table of that application; recording a chart of rights in the memory of the chip card, the chart of rights associating for each of the plurality of applications, the name for the at least one data table thereof with i) the name for each of the plurality of applications, and user applications thereof, that are capable of using the at least one data table thereof and ii) a set of rights granted to the plurality of applications, and user applications thereof, which are capable of using the at least one data table thereof; and giving permission for management of data elements contained in a table of data as a function of a set of rights granted to a particular one of the plurality of applications, and user applications thereof, that will be in progress when the table of data will be used.

20 Claims, 9 Drawing Sheets

|  | ENCIPHERING KEY | NAME OF APPLICATION | PASSWORD OF APPLICATION | NUMBER OF PRESENTATIONS PERMITTED | TYPE OF APPLICATION | USABLE MEMORY SIZE | |
|---|---|---|---|---|---|---|---|
|  |  | SYSTEM | SECRET | 1 | A | TOTAL | 141 |
|  | KEY 1 | BANK | FORTUNE | 1 | A | 300 | ← CREATE |
|  | KEY 2 | GARAGE | CAR | 5 | A | 40 | 142 |
|  | KEY 3 | SOC SEC | HEALTH | 5 | A | 180 | 143 |
|  | --- | --- | --- | --- | --- | --- |  |
|  | KEY n | WITHDRAWAL | USE 1 | 3 | U | 10 | 144 |
|  | KEY n+1 | TRANSFER | USE 2 | 3 | U | 20 | 145 |
|  | KEY n+2 | DISLAY | USE 3 | 3 | U | 30 | 146 ← CLOSE |

14

COUNTDOWN

FIG.3

| NAME OF TABLE | NAME OF APPLICATIONS OR USER APPLICATIONS | RIGHT GRANTED | 16 |
|---|---|---|---|
| TABLE 1 | WITHDRAWAL | 1 1 0 0 |  |
| TABLE 2 | COUNTDOWN | 0 0 1 0 |  |
| TABLE 3 | BANK | 1 1 0 1 |  |
| TABLE 1 | TRANSFER | 0 1 0 0 | ← GRANT |
| TABLE 1 | DISPLAY | 0 0 0 0 | ← REVOKE |

FIG.5

| DES 1 | DES 2 | DES 3 | NUMBER OF COLUMNS | TYPE | NUMBER OF TABLE | APPLICATION NAME | COLUMNS | | | | SELECTIONS |
|---|---|---|---|---|---|---|---|---|---|---|---|
| XX | YY | ZZ | 7 | T | TABLE 1 | BANK | /// | | | | |
| / | / | / | 4 | T | TABLE 2 | GARAGE | | | | | |
| / | / | / | 15 | T | TABLE 3 | SOC SEC | | | | | |
| | | | / | V | TABLE 21 | MALFUNCTION | | | | | ↑ |

15 → (table)
→ MADE
← REMOVE
↔ MODIF
— NAME OF CHART CORRESPONDING TO THE VIEW

SECURED METHOD FOR LOADING A PLURALITY OF APPLICATIONS INTO A MICROPROCESSOR MEMORY CARD

BACKGROUND OF THE INVENTION

1. Field of the Invention

The present invention has been made in collaboration with the Université des Sciences et Techniques, and the CERIM and LIFL laboratories. Its object is a secured method for the loading of several applications in a memory card provided with a microprocessor, often called a chip card. Chip cards such as these typically have three types of use. In a first use of identification, they constitute keys by which their bearer can gain access to a place or a service. In a monetary use, either they are pre-loaded with units representing a possibility of consumption with a party that issues chip cards (generally in telecommunications) or the information that they contain represents a balance of a bank account. As a last type of use, data storage may be noted: for example in order to manage health matters, each individual is provided with a card in which his medical history may be recorded, or again the card may replace an identity card.

The present card seeks to enable the coexistence, on a same card, of these different uses without its being possible for the use of the card that is made for one application to hamper the use of the card for other applications. To this end, the invention procures a safe method for the loading of the different applications so that they cannot interfere with each other. The invention covers also the facility of structuring attached to an application and the interrogation of the data elements by application. Furthermore, the system can be used to make it possible for the applications to permit certain data to to be "seen" by certain applications in total confidentiality.

2. Discussion of the Related Art

A first mode of managing several applications in one and the same card is known. It shall be described here below and it shall be shown that, despite its performance characteristics, this known loading method comes up against certain limitations. The method of the invention will show these limitations can be overcome.

Figures 1, 2:
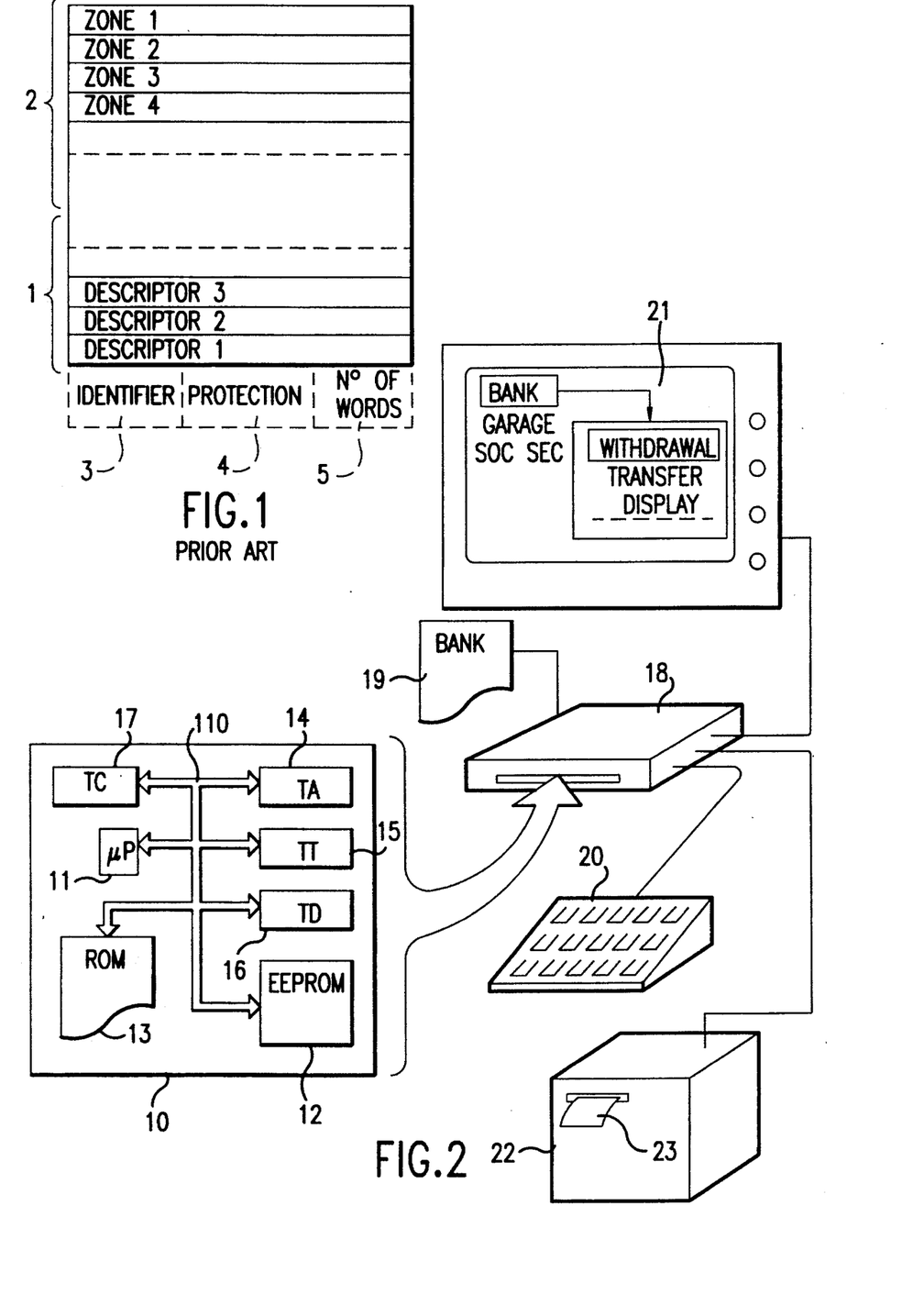
FIG. 1 is a depiction, already commented on, of an organization of the memory of a chip card in the prior art.
FIG. 2 is the schematic drawing of a chip card according to the invention and its use as a transaction tool.

FIG. 1 exemplifies a sharing of the memory of a chip card that can suit several applications. A memory of a chip card such as this is, in this case, physically divided into two essential parts. A first description part 1 contains descriptors, a second part 2 comprising pure memorizing zones. A descriptor represents an application. It comprises a certain number of bytes in binary language. A first byte 3 is called an identifier byte. It enables the application to be designated. If, at the time of a transaction with the card, a secret code and the identification of the application are presented, immediately the descriptor for which the identifier corresponds to the secret code presented is reached.

A descriptor also comprises a protection element 4 after the identifier. A first byte of this protection element 4 relates to the protection, in reading mode, of the words of the memory, another byte relates to the protection in writing mode, a third and fourth byte relate to the erasure or updating if, furthermore, the technology (EEPROMs) of the card allows it. It could be assumed, for example, that these information elements are encoded on one bit of the protection byte: when it is equal to zero, it prevents action whereas it permits it if it is equal to one. Similarly, in writing mode, it could be assumed that third bit (or another bit) of the second protection byte prohibits the writing if its value is zero or, on the contrary, permits it if its value is one (or possibly the contrary). This is also the case for the erasure or the updating.

As the last essential part, a descriptor finally comprises a number 5 of the memory words used by the concerned application. This number is encoded, for example, on two bytes after the codes of the protection element 4. An application concerned by a descriptor may thus contain a number of memory words equal to any number, for example 18. To know where the words of the memory are located, in the part 2 of this memory, which corresponds to this application, an instruction of the microprocessor of the chip card computes that the first 18-word address permitted is equal to the sum, plus one, of the words allocated to the previous descriptors in the list of the descriptors of the chip card. The last address permitted is equal to this sum plus the number of words indicated in the descriptor, i.e. in this case 18.

If, in one example, an identifier has corresponded with a third descriptor, independently of the question of whether or not it is possible to read or write in the concerned memory words, it will be known that the memory zone allocated to the application corresponds to that of the descriptor 3, that it is placed after those allocated to these descriptors 1 and 2 respectively, and that its length is limited by the number of words allocated to this descriptor 3.

The microprocessors therefore at present, in their set of instructions, comprise instructions organized in sequence and stored definitively in the memory (ROM) of the chip card, at the end of which, firstly, it is possible to identify a chosen application and, secondly, there are known ways of irrevocably limiting access to an allocated set of memory words.

To create novel applications, there is furthermore provision, in this set of instructions, for a creation instruction by which it is possible to add a descriptor to the sequence of descriptors already present (to the extent that the memory space allows it) and to allocate a number of memory words (here too as a function of a memory space available in the card) to this application described by this descriptor. The memory zone allocated to a novel application is completely independent of that allocated to the preceding applications.

While this technique, with the associated set of instructions, is efficient, it has a first limitation which is that it prevents an application from working in the memory zone reserved for another previously recorded application. This is understandable because it is the safety-related aim of the invention. However, in certain cases, it is possible that the owner of an application wishes to obtain access, in a complementary application that he would have programmed himself, to one or more memory zones that he has previously allocated to himself. Here, this is not possible. The structure is not flexible.

To give an approximate idea, it may be assumed in a banking application that a banker, by means of an application recorded and represented by a descriptor 1, has already permitted the bearer of the card to withdraw a certain sum of money per week from his account. He may subsequently wish to allow this same holder to make account-to-account transfers from the bank account represented by his chip card. In the present situation, this second application has to be entered completely independently of the first one. This leads to a duplication of certain memory zones, and to a problem of their management. The balance present in one of the memory zones of an application is, for example, affected by a withdrawal while the balance, which is theoretically the same, in another memory zone corresponding to the transfer, is not correlatively debited by the sum corresponding to the withdrawal.

In this case, the solution for the banker would be to eliminate one of the applications and enter another application, as a replacement, which would include the totality of the instructions of the preceding applications. This causes a loss of space in the card. Since, furthermore, it is known that the sizes of memories in these cards are limited, it will be seen that this technique is not without drawbacks.

Furthermore, the last bytes of the descriptor provide information on the number of words that can be used in the memory, but this is not always a good procedure. Indeed, especially in operations for the storage of pure data, it is possible to choose memory word lengths that are either fixed lengths, for example 30 bytes (it being possible to assign each byte to one character), or a variable length. However in this case it is necessary, after each recorded information element, to show a separating byte (a character), for example corresponding in ASCII to a star or a fraction bar, whether oblique or otherwise. A structuring such as this has the drawback of having to be known with precision by the programmers who use the cards which, in certain cases, leads to cumbersome features during use. Even for a very simple application, it is necessary to have perfect knowledge of the entire operation of the card or of the microprocessor.

Furthermore the fixed length format, in most cases, may lead to a systematic loss of space owing to an oversizing of the lengths of the words in order to overcome every problems.

The problems of security or of the right of access to the data elements of these cards are related to the location of these data elements in the memory.

There is also another known prior art structure divulged by the document WO-A-8707061. However, this document provides for only one hierarchical structure of the actors. The actors of the same hierarchical level are not supposed to act at different levels. It is even truer that actors foreign to the application cannot be stacked in the hierarchy and be permitted to consult or even modify recordings of a data table. This document proposes no approach to overcome this problem.

SUMMARY OF THE INVENTION

It is an object of the invention to remedy these drawbacks and limitations by proposing a completely different structure and organization of the data elements of the applications in the card, the security of this card dictating no particular locations in the memory for the data elements. In this structure, instead of associating, as an indissociable element, firstly an identifier relating to the application, secondly conditions of protection and, thirdly, allocations of memory zones with which the applications work, it is preferred to organize the relationships among these different concepts hierarchically.

As shall be seen hereinafter, first of all a relationship is created among the applications, the identifiers and preferably secret codes. This relationship is memorized in the card in a chart called a chart of applications. Then a recording is made, in a second chart called a chart of tables, of the relationships that may exist between a given application and a table of data elements with which this application works. This chief characteristic, the creation of a table of data elements, is permitted only for an owner of an application. The table of data elements shall then be said, in the rest of this explanation, to belong to the application. Finally, in a third chart, called a chart of rights, the possibilities of interaction of the different applications and user-applications on the created tables are organized.

A distinction is therefore made here of classes between applications, for example the banking application, and user applications. It is seen that, for the essential difference between the applications and the user applications in the chart of applications, a possibility of memory is allocated to the applications (to create data tables corresponding to this application) while the user applications receive no memory possibility for this purpose. The user applications must, in order to function, use a part of the memory lent to them by an application.

As an essential advantage, the system of the invention enables the progressive modification of the data tables, the creation and destruction, by the owner of an application, of his user applications and the delegation, also by this same owner of an application, of rights of access on his data tables to other applications or user applications. The user applications may work on data tables already present in the memory of the card, inasmuch as the owner of the application allows it (chart of rights).

Furthermore, the question of the economizing of memory space is settled by the permitting, in the chart of the data tables, of the systematic possibility of having recordings of variable length.

An object of the invention, therefore, is a method for the loading and management of several applications capable of implying user applications in a chip card, an application having available
the right to constitute user applications,
the right to set up data tables, and
the right to grant rights to applications or user applications on its own data tables, a user application having none of these rights available, where for the loading of applications or user applications
a recording is made in the memory of the chip card of a table of applications and, of user applications, if any, which associate a password and a memory space with each application or user application
a recording in the memory of a chart of data tables, the data tables of this chart associating, for each application, a table name with the name of the application and with the data elements pertaining to this application,
a recording is made in the memory of the chart of the rights granted to applications or to user applications on these data tables, this chart of rights associating, with each name of the data table, names of applications or user applications and rights granted to these applications or user applications and where for the management of the applications or user applications,
permission is given for the management of the data elements contained in a table of data elements being used as a function of the rights granted to an application or to a user application in progress.

BRIEF DESCRIPTION OF THE DRAWINGS

The invention will be understood more clearly from the following description and from the figures that accompany it. These figures are given purely by way of an indication and in no way restrict the scope of the invention.

Of these figures.

DESCRIPTION OF PREFERRED EMBODIMENTS

FIG. 2 shows a schematic organization of a chip card according to the invention. This chip card 10 has, on a support, an electronic circuit provided with means of exchange with the external world that are not shown but are of a known type (contact metallizations). This electronic circuit had a microprocessor 11 and a data memory 12 (in one example, this data memory 12 is of the EEPROMS type, i.e. it is programmable and erasable). The chip of the chip card also has a program memory 13 (ROM) that contains the instruction of the microprocessor proper to the invention. According to what has been indicated here above, in the memory of the chip, in addition to the data memory 12, the presence of the following is recognized: a chart of applications 14, a chart of tables 15 and a chart of rights 16. Also noted is the presence, which shall be explained further below, of a chart 17 of enciphering keys. Since the chart 17 is a particular chart, it can also be defined on a complementary basis in the chart of the tables 15. This enables an enciphered transmission of the data elements read in the memory 12. The microprocessor 11 is connected to the different memories 12 to 17 by a data and address bus 110. A typical architecture of a microprocessor is described in Daniel Quayssac, *Comprendre les Microprocesseurs*, Editions Radio, France 1983.

During the use of a chip card 10 such as this, the card is introduced into a reader 18 which itself comprises a microprocessor (not shown) capable of performing, with the card 10, a program 19 by means of a keyboard 20, a display monitor 21 and a machine For example, as shown on the monitor 21 for a banking application, an operator acting on the keyboard 20 may cause a withdrawal, and hence prompt the execution of a part of the program 19 by which the machine 22, for its part, will dispense banknotes 23 to him. At the same time, the reader will make a recording in the chip card (or in a centralized management system which is not shown) of the debiting of the corresponding account.

A schematic indication is given, on the screen of the monitor 21, of the presence of several possible applications: a BANK application, a GARAGE application, a SOCSEC (social security) application. Other applications could have been shown, for example TELECOM for telecommunications, etc. The value of the invention arises out of the fact that different operators, different issuing parties, also called owners of applications, who have no contractual relationships with one another, may use one and the same carrier and may do so without any risk that the actions performed by one of the owners of applications or users will influence the data elements recorded in the data tables belonging to another owner of an application (the risks pertaining thereto in the banking sector can easily be grasped).

Furthermore, for the banking application, several possible uses are shown on the screen of the monitor 21: these include, for example, the uses WITHDRAWAL, TRANSFER, DISPLAY. It is therefore possible to make a clear hierarchical distinction between, firstly, the applications and, secondly, user applications. As shall be seen further below, these applications and these user applications are all recorded in the table of the applications. However, the difference that separates them lies in the fact that the applications can create and exploit (reading/writing, updating, erasure) data tables while the user applications can only exploit them. This exploitation is controlled in two ways. Firstly, a memory allocation permits the insertion recordings, or lines, into a data table if this allocation is not zero. Secondly, the chart of rights can enable this user application to insert (INSERT), delete (DELETE), modify (MODIF) or only select (SELECT) a recording in a data table on which these rights have been received.

Since the memory of the card is shared among several applications, during the creation of the applications and user applications, a maximum size of usable memory is defined for each application or user application. By its principle, this information on size is memorized in a counter present in the chart of the applications. When data elements are added to a line of a data table by an application or a user application, the contents of the counter are reduced by the number of characters inserted. Should data elements be destroyed in a line of the table, the content is increased by the number of characters eliminated. Instead of characters, it is also possible to specify a number of lines of information in the memory allocation: the size of the line being possibly free (within the limits of the space available).

In the following description, each of the charts of the invention shall be presented, with a specifying of, firstly, their structure and, secondly, the commands to which they respond, namely the instructions that the microprocessor is entrusted with carrying out (to the exclusion of all other instructions) to create and modify them.

Figure 3:
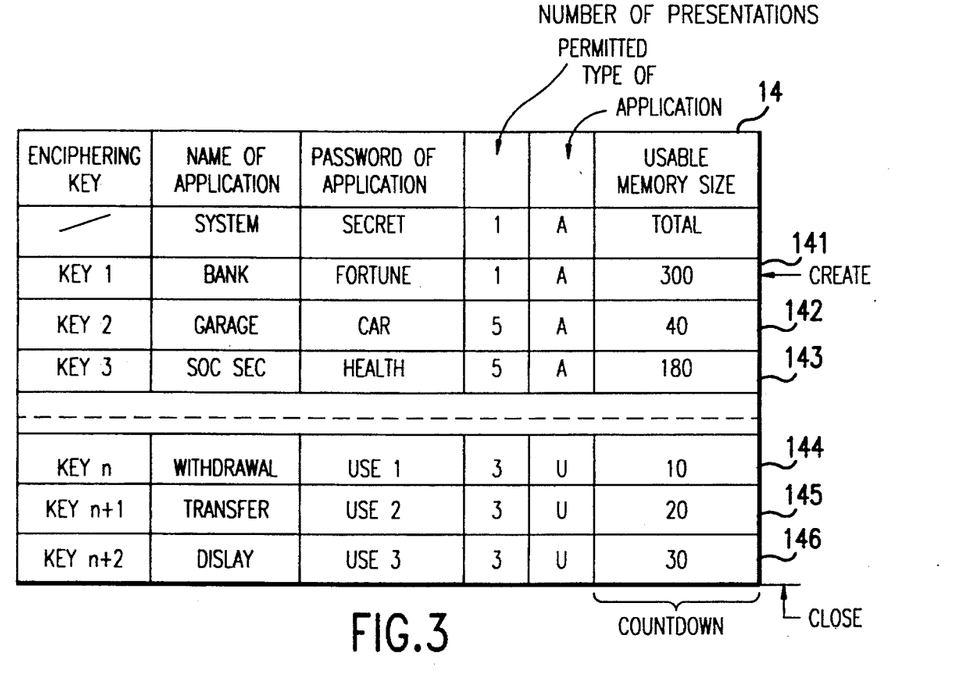
FIGS. 3 to 5 show precise depictions respectively of the charts of applications, charts of rosters and charts of rights.

FIG. 3 shows the chart 14 of the applications. This chart comprises essentially four columns. A first column is the NAME OF APPLICATION column. A second column is the PASSWORD column of the application. A third column is the USABLE MEMORY SIZE column. Preferably, although it is not obligatory, the password column is itself divided into two parts, a first part comprising the secret code itself and a second part, located before and after the first one, containing a maximum number of tests that are likely to be made for the presenting of the secret code to enable entry into the application. Similarly, for the data tables, preferably, the chart of the applications will have columns with variable length.

For example, the name of the application and the password of the application are limited in length. The number of tests for presenting the secret code, and the usable memory space will be memorized, in fixed length, by a value contained respectively in one or two bytes. The way in which it is possible to provide for variable sizes shall be seen further below.

As a reminder of what was presented here above, six recordings 141 to 146 were presented in this chart: the first three represent applications properly speaking, with a usable memory size that is different from zero, the last three represent user applications and they too have a non-zero usable memory size. These user applications cannot subsequently create data tables. To distinguish them from the applications, they comprise, in a fourth column, an indication (herein U) mentioning their type: user application. The applications proper comprise a corresponding indication A. Naturally, other symbols can be used. What counts is their being differentiated.

To simplify matters, a password has been attributed to each application, for the BANK application, the password is FORTUNE; for the GARAGE application, the password is AUTO, for the social security application, the password is HEALTH. For the three uses, WITHDRAWAL, TRANFER, DISPLAY respectively, the passwords are USE1, USE2, and USE3.

Figure 8:
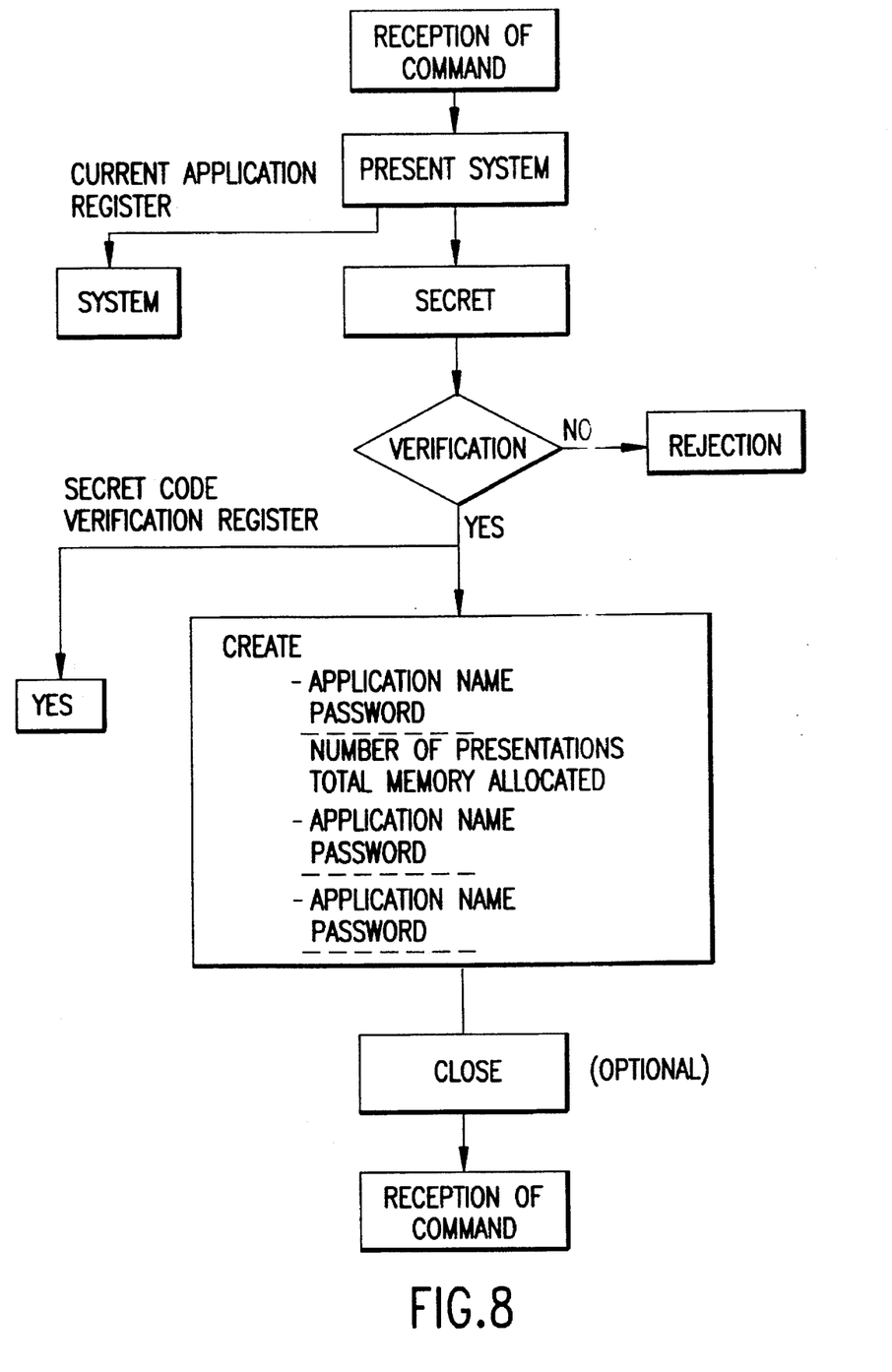
FIGS. 8, 9 and 10 show flow charts of the creation respectively of each of the charts according to the invention.

FIG. 8 shows the operation for the creation of the chart of applications. This creation is normally done by the manufacturer of the chip card or by an issuing entity who has obtained the password of a SYSTEM application from the manufacturer. To simplify the description, it will be assumed that it is the chip card manufacturer who has performed this operation. Following the habitual practice, this operation shall be called the customization of the card. This operation consists in introducing, into the card, the BANK, SOCSEC and GARAGE applications. Whoever carries out the customization assigns secret codes, preferably by a random method, to the applications. These applications could, during the first use of the card, change this code (CHANGE CODE) and assign themselves a code that is known to themselves alone.

Before the cards are delivered in a bare state, before they are customized with the different applications, it may be considered all the same that, owing, firstly, to the existence of the instructions of the microprocessor and, secondly, to the organization in the form of charts, they comprise a system application with which it will be possible to program the card.

The system application comprises a PRESENT instruction which must be followed, in its syntax, by the name of the concerned application. To facilitate the internal management of the system, the chart of the applications contains, at least at the start, a particular application called SYSTEM. The system contains the microprocessor, the memory and the program carrying out the functions of the invention. This program is contained in a ROM. In the rest of this description, reference shall be made to instructions of the microprocessor to qualify the functions of the system. The object of the instruction PRESENT is to seek to compare a secret code already recorded in the card with a secret code proposed by the operator with a keyboard like the keyboard 20.

In practice, the operator introduces the card into the reader 18 and sends the preceding instructions PRESENT, SYSTEM with the keyboard 20. Then the secret code SECRET is entered by the keyboard, and the operator validates this entry. A verification is then undertaken to ascertain that the secret code SECRET entered by means of the keyboard is the same as the secret code SECRET previously recorded in the card. The secret code previously recorded in the card is the basic secret code of the chip: it is normally stored in a special part of the memory. This part is not accessible from the exterior of the card. Only the system of the card has access thereto. Should the verification fail, a rejection program is arrived at.

The rejection program may may comprise the permission to present the secret code again, as many times in all as is permitted for the application. For example, in the case of the system application, only one presentation is permitted. To carry out this function, the instruction PRESENT of the microprocessor contains the following actions in the order given:

1) the loading of the number of presentations in an internal register of the microprocessor;
2) the incrementetlon of a counter of attempts at each attempt;
3) the comparison of the counter and of the loaded number;
4) the conditional routing to a definitive rejection or another attempt. The counter of attempts forms part of the chip card.

The rejection program therefore comprises a counter of attempts that can be parametrized by the permitted number of presentations of the password which, when it is full, prompts the rejection proper of the attempt. In practice, this rejection of the attempt may lead the external system (reader 18) to keep the card 10 definitively imprisoned and, in a manner known per se, to orient it towards a receptacle from which its bearer will be not be able to remove it.

If the verification has been done successfully, at this stage of manufacture, hence when the card is with the chip card manufaoturer, only one command can be carried out: the CREATE command. This command CREATE can be used to record all the applications and the user applications desired. With this operation, the manufacturer can insert applications into the applications chart 14 which is also the user applications chart. To this end, it is enough to send the card the command CREATE, followed by the name of the application, the secret code assigned to this application, the memory space that can be used by this application and the permitted number of unsuccesful attempts to present this secret code for this application. To distinguish the user applications from the applications, to this command there is added a parameter A for the applications and U for the user applications. Or again, preferably, the card has a pair of commands available, CREATE APPLICATION and CREATE APPLICATION USER which have the same parameters as the preceding CREATE but automatically place the indications A or U respectively. Thus, the recordings 141 to 146 are entered. When all the applications of the uses have been created in the chart 14, it is possible to send an instruction CLOSE with the keyboard This instruction CLOSE enables the switch-over, for example definitively, of the possibility of inserting applications with the command CREATE APPLICATION. Indeed, if the manufacturer does not know all the applications at the time of the customization, it possible later, provided that the command CLOSE has not been launched, to insert other applications by redoing a PRESENT SYSTEM command followed by the right secret code. The command CLOSE closes this function by invalidating the SYSTEM application. In fact, the SYSTEM application is then quite simply removed from the chart of the applications. It can then no longer be recognized by the card. By contrast, the applications may retain the right to create user applications with the command CREATE-APPLICATION USER.

At the physical level, this invalidation is obtained by the blowing of a fuse or by the irreversible switching of a memory cell of an EEPROMS type memory from one logic state to another. The operation CLOSE may be followed by an operation REBOOT to reboot the card: the electrical supply of the chip should be cut off and then restored. In this case, the chart 14 of the applications is definitively frozen.

If the instruction CLOSE is not sent, the card is not locked.

FIG. 3 shows the association of the enciphering keys with the applications. This means that the chart 14 of the applications may comprise, as a fifth column, a column representing enciphering keys. In this case, the enciphering keys must be indicated once and for all: it can never be modified for it may be that the chart 14 is no longer accessible after the command CLOSE. In practice, and contrary to what has been indicated for purposes of simplification with reference to there will be a chart 17 of the enciphering keys in which the applications and the enciphering keys will be associated one by one to each other. Since the chart 17 of the enciphering keys is modifiable, the value of the key can be modified for each application.

The encipherings in question here are DES or RSA type encipherings, which as it happens are known, for which the parametrizing of the enciphering necessitates a key that is called secret key when it is known by only one user and a public key when it common to all the users of the application. The enciphering of a data element consists in modifying this data element according to an algorithm such as this, parametrized in this way. The microprocessor is provided in a known way with the instructions necessary to carry out an algorithm such as this. By this principle, the microprocessor of the card may implement the enciphering keys attached to an application without its being necessary for the applications to share keys. The chart of the keys should contain, at each line, the key and the application for which it is intended.

Figure 4:
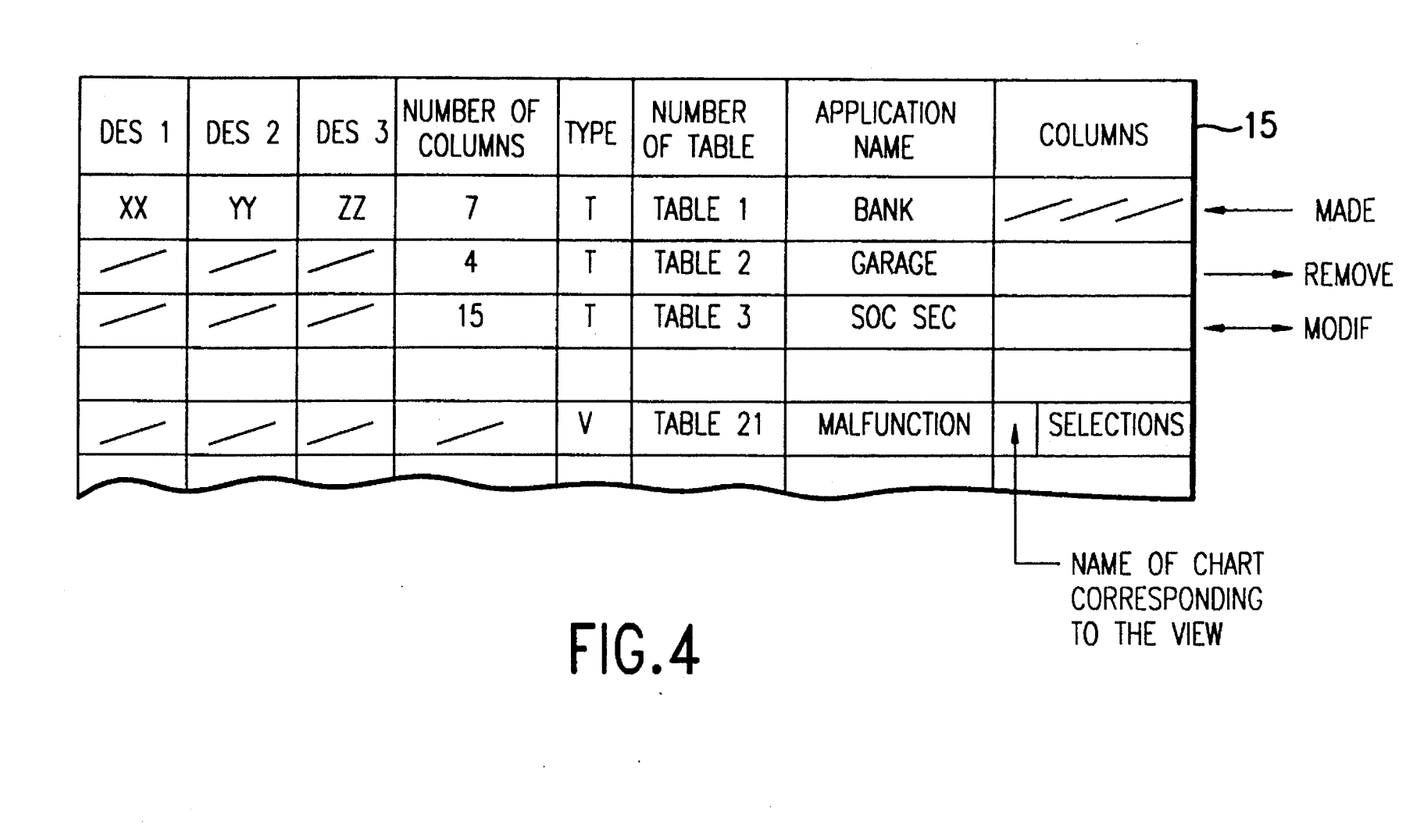
Figure 5:
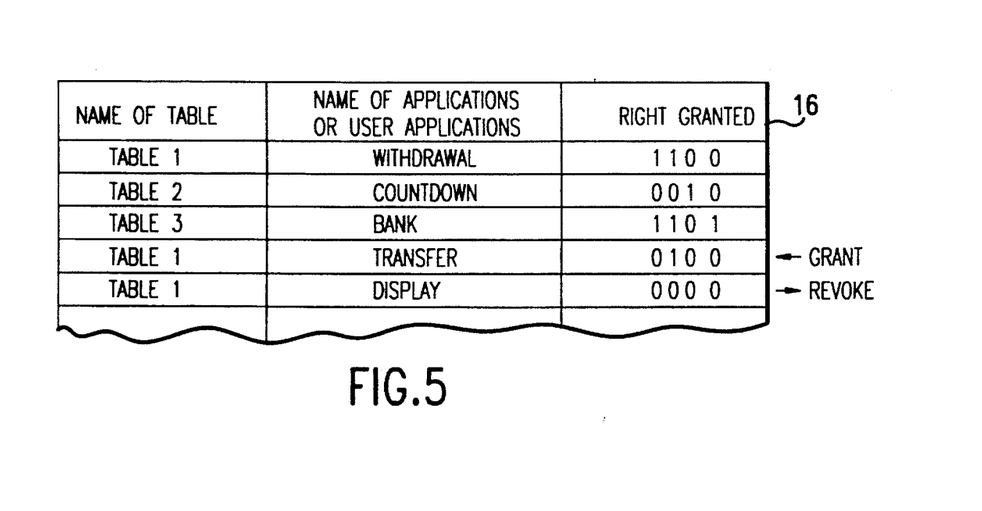

FIG. 4 shows the chart of the data tables 15. This chart is not closed definitively in the card: it may be complemented or modified througout the lifetime of this card. To simplify the description, it has been indicated that the command carried out by the microprocessor to create a recording in this chart is a MADE command. This MADE command can be associated with a REMOVE command by which it is possible to eliminate a recording. The chart of the tables 15 is shown in a theoretical form in FIG. 4 and in a real form in FIG. 6. It comprises essentially, confer FIG. 4, the association of an application name, a table name and a description of the columns of the data table created. Furthermore, in a preferred way, the chart of the tables 15 comprises columns pertaining to designators, in this case three types of designators, as well as a column relating to the number of columns of the data table itself, and finally another column relating to the type of table, T for table, and V for view, represented by the recording.

In FIG. 4, it is seen that a table has been assigned to each of the main applications, namely TABLE1 to the application BANK, TABLE2 to the application GARAGE, TABLE3 to the application SOCSEC. It can be seen that there is no table proper to the user applications indicated here above because, since the latter are provided with the indication U, it is forbidden for them to create tables. These user applications can only insert, modify, erase or select data elements in already created tables (if rights have been granted to this effect).

Figure 9:
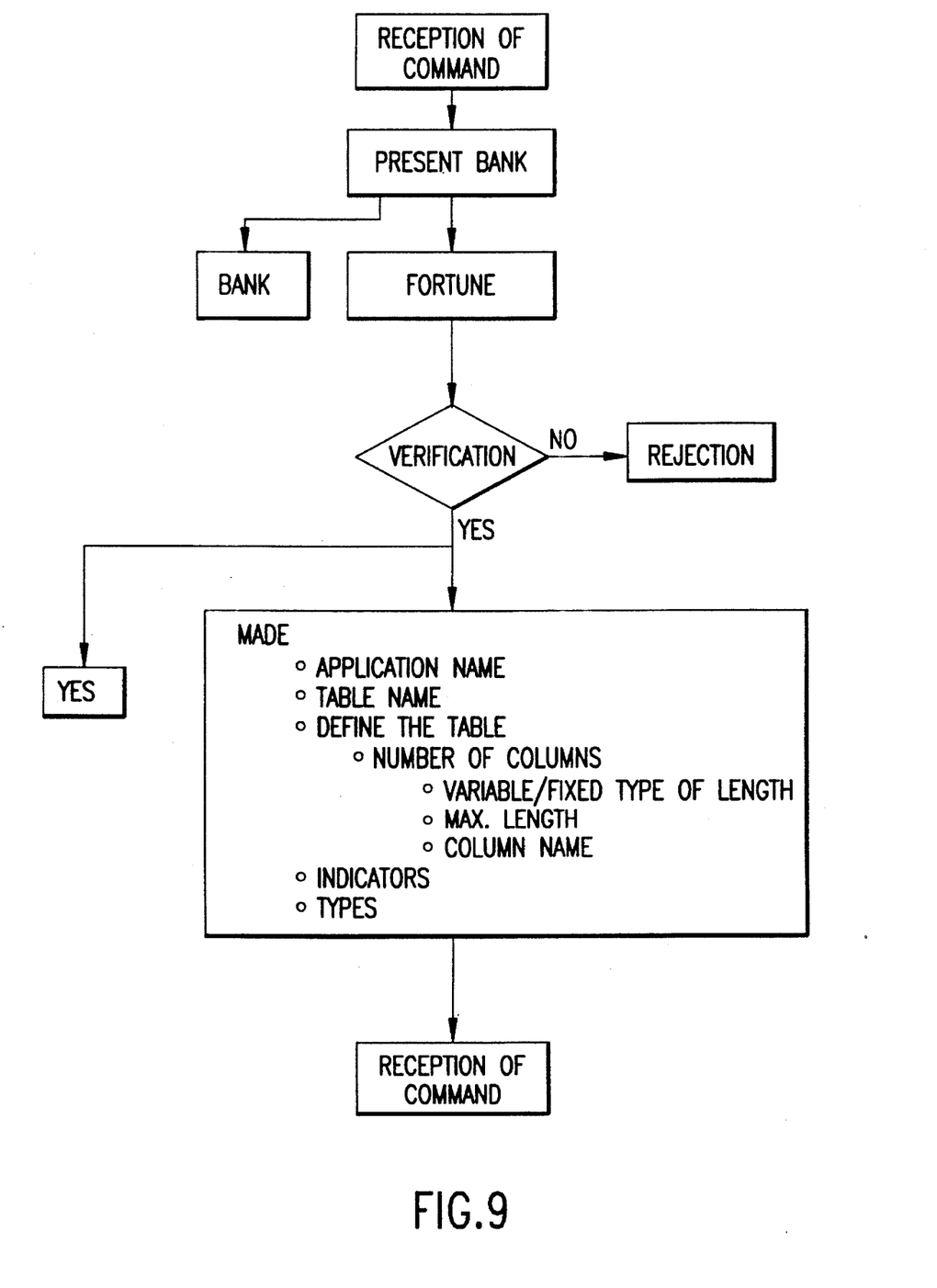

The chart 15 of the data tables is created progressively by the owners of the applications according to the flow diagram shown in FIG. 9. To create a table, for example TABLE1 in the chart 15 of the data tables, an owner of an application carries out, as above, a command PRESENT, in the present case "PRESENT BANK". In this case, the microprocessor according to the algorithm already examined further above requests the verifying of the concordance of the secret code, associated with BANK in the chart 14, in this case "FORTUNE", with a secret code entered by the keyboard. Should this verification be successful, it is possible to carry out the commands MADE or REMOVE.

All the commands, including the command PRESENT, are carried out while the microprocessor of the card is in COMMAND RECEPTION mode: it waits for an external activation. As soon as a command is sent (for example through the keyboard), this command is firstly analyzed by comparison with the possible commands for the microprocessor. If the command is wrong, prohibited or wrongly received, at the end of the analysis, the card returns to a state of waiting for COMMAND RECEPTION. If not, the execution is begun. As far as the PRESENT command is concerned, it prompts the recording, in a register of the microprocessor called the current application register, of the name of the application for which this PRESENT command is launched. For example, this current application register is loaded with the names SYSTEM or BANK in the two examples shown in FIGS. 8 and 9 respectively. After this loading, the comparison of the secret code is carried out and prompts the recording, in the event of success, of the of a similar indication, YES, in a secret code register of the microprocessor. Thereafter, the microprocessor returns to a state of waiting for a command. To carry out the commands MADE or REMOVE, the microprocessor ascertains, after analysis of these commands, that tee application (BANK) for which these commands have been sent is associated, in the chart 14 of the applications, with an A type indication enabling the creation of the data table. If the indication is U, the creation or the removal are prohibited.

With the command MADE, the automatic program related to this command bears the contents of the current application register at the position, in the chart 14, of the name of the application. This is automatic. In the example where the BANK application is involved, this application name is automatically carried by the microprocessor in the corresponding column. It is then necessary to specify the name of the chart and define the chart and the columns in a determined order. The definition of the table comprises essentially the designation of the number of columns and, for each column, the designation of the type of column: column with variable length or fixed length. It is also necessary to indicate the maximum length of the column (whether with a variable length or a fixed length). Preferably, this length will range from 1 to 255. Finally, it is necessary to give a name to each column of the data table. The description of the columns must be done as many times as there are columns. The type of chart T for chart and V for view are also defined. What this type corresponds to shall be seen further below.

At the end of the MADE command, the system returns to command reception mode. If a REMOVE command is carried out, a recording is removed from the chart 14, provided that the user is the owner of the application, i.e. that he is capable first of all of entering both the name of the application and the secret code attached to this application. The chart of the data tables creates a relationship of property between the owner of the application and the table.

Figure 6:
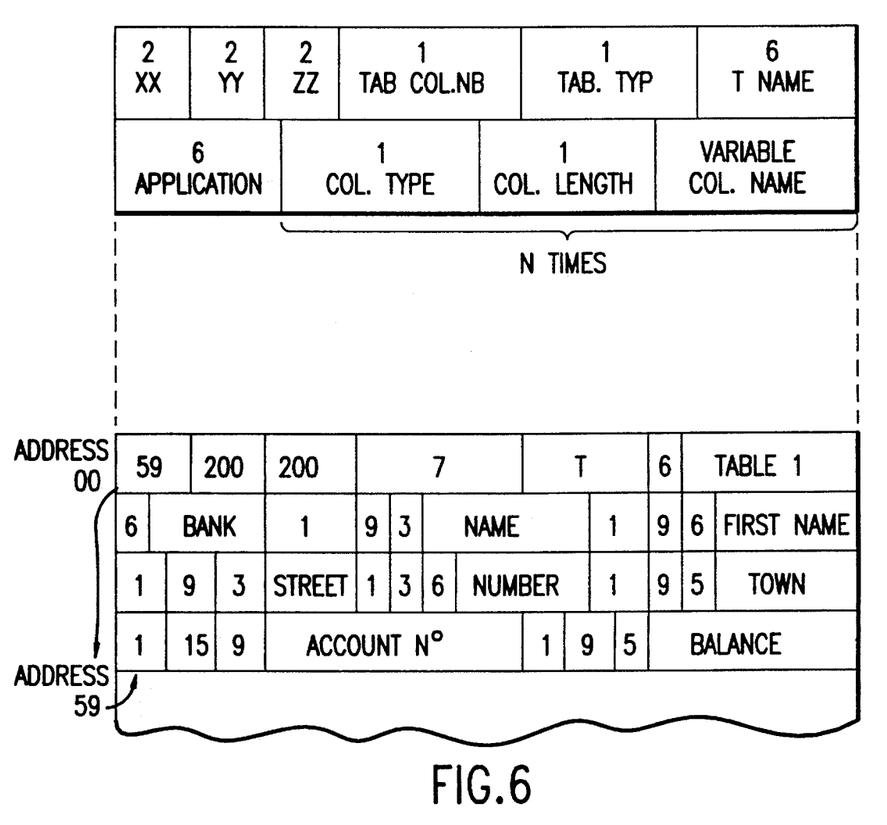
FIG. 6 shows particular features of organization of the data elements in the chart of tables.

FIG. 6 gives a more detailed view of the manner in which the chart 15 of the data tables is constituted. In order not to lose space, this chart of the data tables comprises indications tending to compact the storage of data in the data memory 12. At the top of FIG. 6, it is possible to distinguish three first designators: the designators XX, YY, and ZZ. This means that each of them is described on two bytes. Each designator represents an address. The example shown just beneath the top of FIG. 6 makes it possible to get a picture of the meaning of the different elements. Thus, the first designator XX marks the relative address, in the part of the memory 12 that contains the table 15, of the end of the recording which has begun with this designator.

As shall be seen further below, the recording in question in the example has fifty-eight characters and consequently, the code XX comprises the address 59. This means that to look for a description of a following data table, it is necessary to go through fifty-nine additional bytes. This enables the microprocessor swiftly to ascertain those data tables to which it can have access for a given application.

The second designator YY gives the address of the first recording stored in the data memory which is described according to the data table studied. For example, if YY is equal to 200, the first information element recorded in the data memory 12 according to the structure of the data table studied is at the address 200, see FIG. 7. The third designator ZZ indicates the address of the last recording pertaining to the table. In view of the description of the table in question, and because there is only one recording, this address ZZ too is equal herein to 200 like YY (FIG. 7).

After the designators, on one character, the number of columns of the table is indicated. For the banking application, this number of columns is equal to 7 (see FIG. 4). Then the type of table is indicated, also on one byte. In the present case, this is a a table, and a letter T is indicated. If it were a view, then an indication V (or other) would have been made to appear. Furthermore, the difference between the tables and the views will be indicated. Then the name of the table indicated. Here, in a preferred way, the indication of the name of the table is preceded by a byte that signifies the number of characters (bytes) of this name of the table. The table in question being TABLE1, the name of which comprises six characters, the value 6 will be carried in this byte. The name of the table is then given on six bytes. It will be observed that it is possible to accept all the standard characters except characters corresponding to control characters for the microprocessor but that, furthermore, a table name will be prohibited if it already exists for another application. The MADE command carries out this verification. The name of the application in the data table too can entered by being preceded by a byte with a value equal to the number of characters of this name of the application. In the present example, too, 6 has been chosen. Consequently, the names of applications in the table 15 can have only six characters. If the recording of the name of the application is automatic, this name could be taken up as it exists in the chart 14, i.e. with fixed length or variable length. In the latter case, its length too is entered. Then, as many times there are columns in the data table, an indication is given of the type of column on one character, the length of the column on another character and, finally, preceded by its number of characters, the name of the column. In the example shown at the bottom of FIG. 6, seven columns have been represented, each time with a code "1" representing a type of column with fixed length. This fixed length itself is fixed so as to be equal to 9 for the first three columns, 3 for the fourth column, 9 for the fifth column, 15 for the sixth column and 9 for the seventh column. Then, the names of these columns are given each time in being preceded by the number of characters in these names. What is done is to provide information on the name, first name, street, number, city, account number and bank balance of the bearer of the card. The command MADE also enables the microprocessor to ascertain that the memory size is smaller than the allocated memory size. For this purpose, it makes use of the maximum lengths indicated. Their sum should be smaller than the allocated size.

Figure 7:
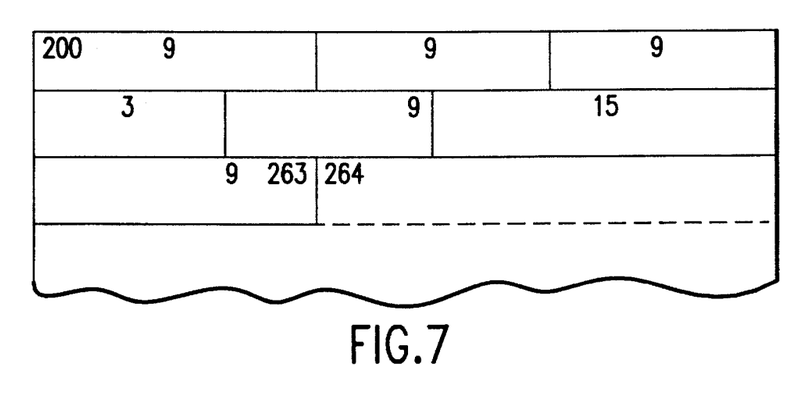
FIG. 7 shows the effect of the organization of the chart of tables on the arranging of the data elements in a data memory of the chip card.

FIG. 7 shows the corresponding recordings in the EEPROMS type data memory 12. It is noted that fixed length recordings have been chosen here, but as above it could have been preferred to choose variable length recordings, thus making it possible, for short words, to compact the zone occupied in the memory 7. The separating character between the variable length words is therefore induced in the invention 1) by the description structure and 2) by the value of the preceding byte. A user who programs his card (to the extent that the application allows him to do so) therefore does not have to bother with this problem.

The chart 16, called the rights chart, shall now be examined. In this chart, an application owner, for example a bank that is the owner of the application BANK will not be able to grant rights of use SELECT, INSERT, MODIF, DELETE on recordings of its table, herein the TABLE1, to user applications WITHDRAWAL, TRANSFER, DISPLAY. In other words, a user who implements a user application can make transactions on the data elements. These transactions are permitted according to the mode described in this chart of rights. To fill the chart 16, a same sequence of operations is carried out, confer FIG. 10. The command PRESENT, associated with the concerned application, for example PRESENT BANK, is sent. Then the secret code, FORTUNE, is presented.

Figure 10:
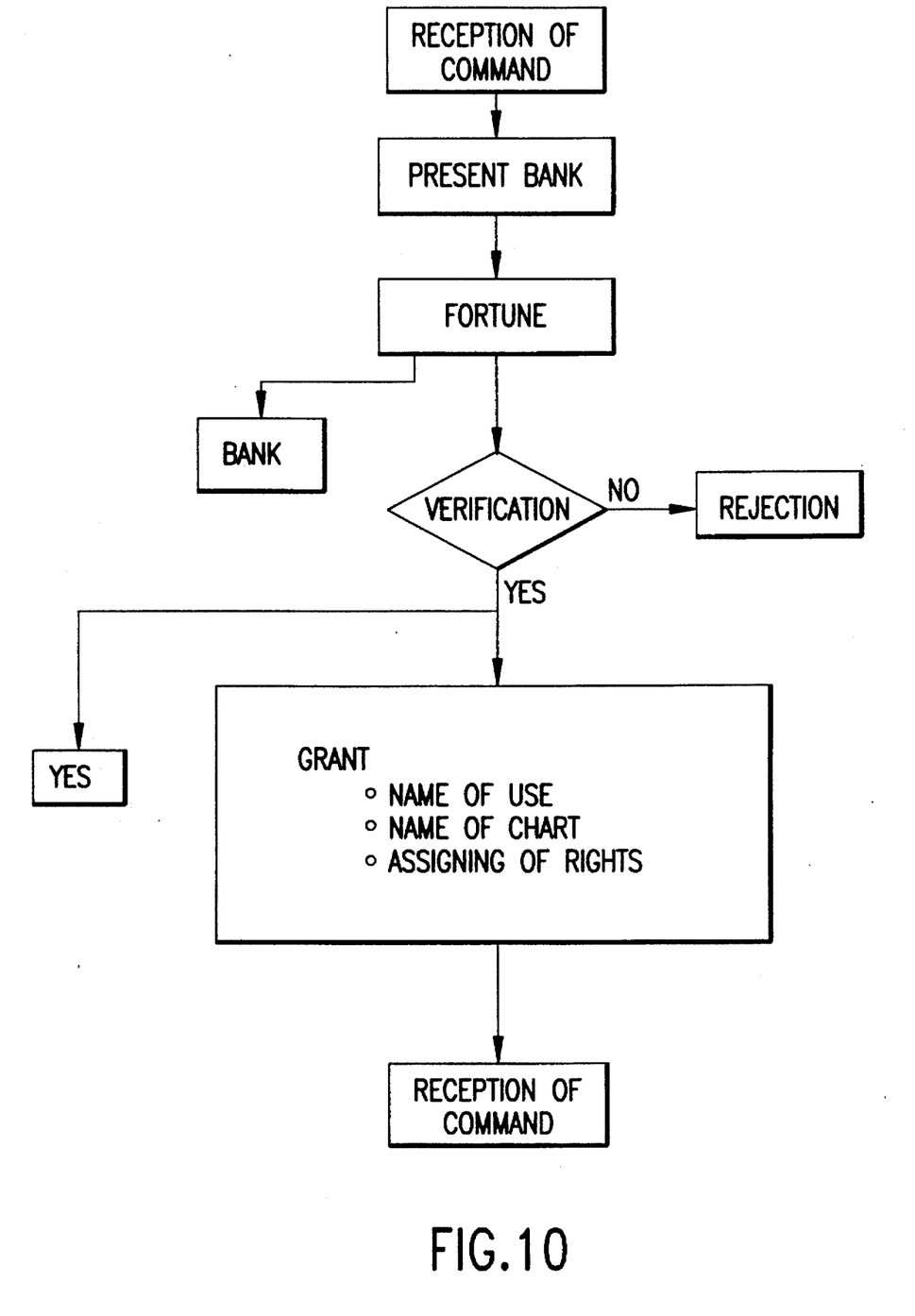

In the event of success it is possible, with a creation command called GRANT to create rights or to to revoke them with a cancellation command REVOKE. In a right-granting operation, the following are designated: firstly the table on which the rights are granted, then the name of the user applications for which these rights are granted and finally the type of rights granted. With the command GRANT the microprocessor ascertains, by means of the chart 15, that the table (for example TABLE1) concerned is truly linked to the application (BANK) for which the rights are granted. This verification uses the name of the current application loaded into the register for access to the chart 15. The rights granted may be encoded on four bytes: a first byte relates to the reading and corresponds to a selection, the other three corresponding respectively, and in the order given, to an insertion of data elements, a modification of data elements or a removal of data elements.

These rights correspond to the commands seen further above. Any application owner who is the owner of the associated data table can enter new rights at any time into these tables in the chart of rights 16, or remove rights.

For the enciphering, the operation is as follows. When, for a use (for example WITHDRAWAL: FIG. 3), data elements extracted from the data memory 12, they are enciphered by an automatic enciphering algorithm of the RSA (or other) type proper to the microprocessor parametrized by the key (KEYS) of the application or user application in question. Consequently, when these data elements are transferred from the card 10 to the reader 18, they are transmitted in an enciphered state. Naturally, the reader has a second enciphering algorithm and also knows the key (KEY1) relating to this application or user application to decipher the information elements transmitted. In this way, an application may permit a transaction on the data elements of a table that it manages with any fear of divulgation.

A description shall now be given of the structure of the instructions of the microprocessor enabling it to carry out all the commands, namely SELECT, INSERT, MODIF and DELETE.

To carry out the commands SELECT, INSERT, MODIF and DELETE, as seen here above a command PRESENT is already carried out. In this case, this command PRESENT will be followed by the name of the user application (or also of the application) for which these commands have to be carried out. It is also followed by the presenting of the assigned secret code. In the event of success, the name of the user application is borne in the current application register and the indication YES is borne in the secret code register. To avoid the need to paraphrase the order of the operations in the description, the relevant drawings will be referred to.

Figure 11:
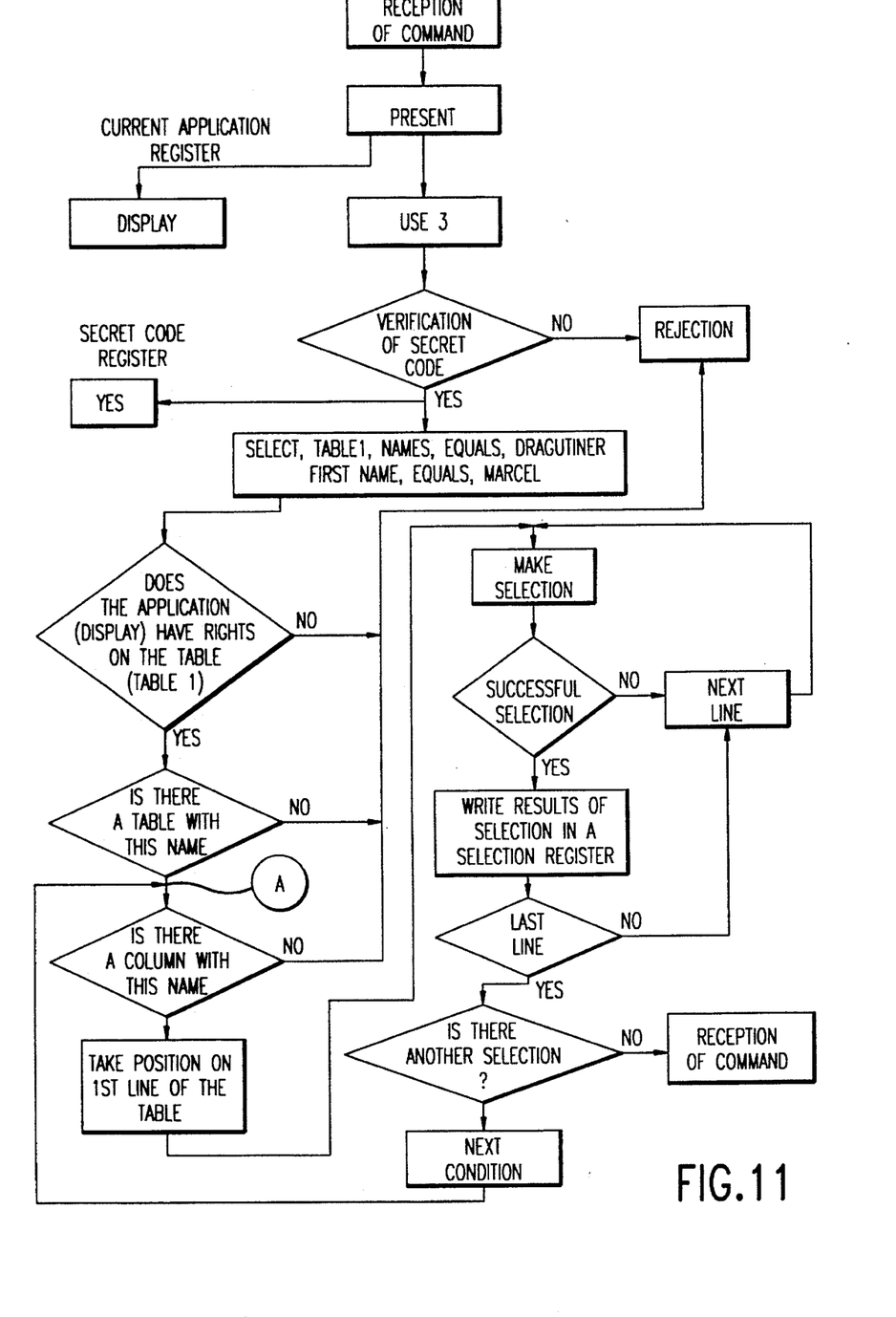
FIGS. 11 and 12 show flow charts of possible action on the data table.

The command SELECT can be launched as follows. Its syntax comprises SELECT followed by the name of the chart and followed by one or more selection criteria. A selection criterion comprises a column name, an operator and a value. The operator may be: equal, different, greater, lower, lower or equal, or greater or equal. The selection criteria may be many and varied. In this case, the syntax of the SELECT command quite simply comprises the different criteria at the end and one after the other. FIG. 11 shows the flow diagram of the SELECT command. In this flow diagram, it is ascertained that the selection, have been accurately indicated. At the end of the selection, the result of the selections is stored in a selection register. The fact that the application has (or does not have) rights on the data table is extracted from the rights chart 16. The existence of the data table and, in this data table, of one or more columns having the specified names is extracted from the chart 15 of the data tables. Once the selected data elements have been arranged in the results register, any known type of operation can be carried out with this data element or elements.

Figure 12:
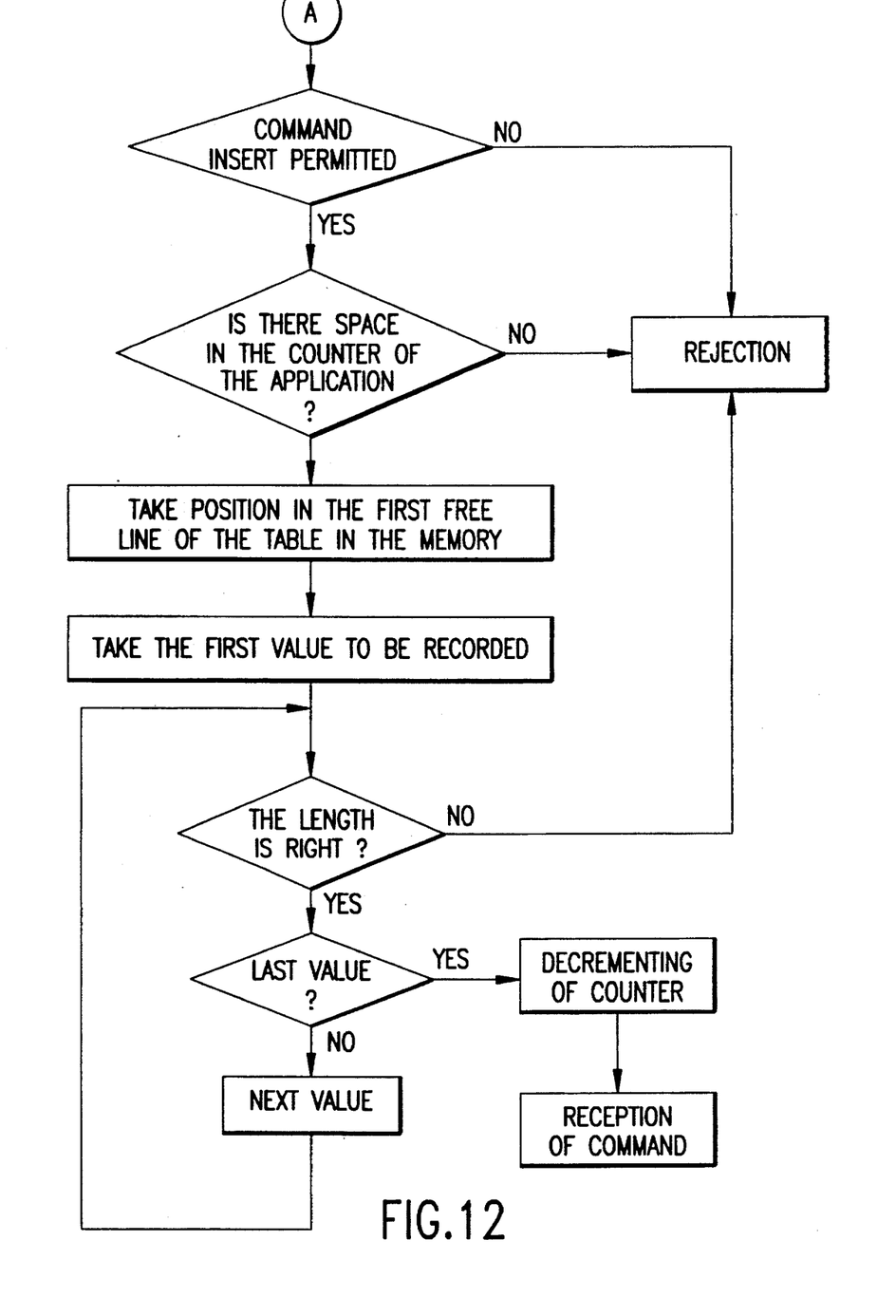

The command INSERT, FIG. 12, has the same antecedent steps as the command SELECT before A. The syntax of this command comprises this command INSERT followed, one after the other, by all the values that have to be recorded in the order in which they have to be recorded. To carry out this command, the microprocessor ascertains that the memory allocation of the application and the usable memory size are sufficient. The zones of the chart 14 in which these usable memory sizes are arranged are erasable and modifiable zones, preferably of an EEPROMS type. Indeed, after the insertion, the value recorded in a zone such as this, for the concerned application, is decremented by the space occupied by the size of the insertion that has just been made. This explains the fact that a user application, the usable memory size of which is zero (from the outset or following the execution of an insertion operation) cannot carry out any insertion in the data table.

The DELETE command is of the same type as the INSERT command, except that it works in reverse. In this case, the counter is incremented at the end. However, to prevent a user application that has no usable memory size at the outset from acquiring one on a data table, it is ascertained beforehand, in the rights chart 15, that the erasure is permitted. This check is of the same type as the checking of the right to carry out the insertion command.

The updating command MODIF has the same syntax as the selection command followed by the name of a column and then of a value. This means that the new value is placed in the selected line or lines at the position of the specified column. The updating may also enable the updating of several different columns, corresponding nevertheless to same selection criteria.

The views V are sub-tables. They enable direct access to recordings which correspond in a data table to selections on data elements. The views are declared, in the chart 15 of the data tables, in the same way as the applications or user applications. The only difference relates to the specifications of the columns which, in their case, are related to a selection. These specifications of columns therefore compromise firstly the name of the data table (for example TABLE2) to which the selection relates and, secondly, the selection itself. This selection is indicated in the same terms as the syntax of the SELECT comand seen previously. In the chart 15, the user applications concerned by the views may receive selection and modification rights but preferably neither insertion nor erasure rights.

What is claimed is:

1. A method for loading and managing a plurality of applications in a memory of a chip card, each of said plurality of applications being capable of a) including at least one user application, b) including at least one data table, c) granting at least one of a plurality of rights, to at least one of a remainder of said plurality of applications, for carrying out at least one of a plurality of commands on said at least one data table and d) granting at least one of said plurality of rights, to said at least one user application, for carrying out at least one of said plurality of commands on said at least one data table, said at least one user application not being capable of including further user applications, said at least one user application not being capable of including any data tables, said at least one user application not being capable of granting any of said plurality of rights, to any of i) said plurality of applications and ii) user applications thereof, said method comprising:

recording a chart of applications in the memory of the chip card which associates a password and a memory space with a name for i) each of said plurality of applications and ii) said at least one user application thereof;

recording a chart of data tables in the memory of the chip card, said chart of data tables including a plurality of records, each of said plurality of records associating said name for each of said plurality of applications with a name for said at least one data table thereof;

recording a chart of rights in the memory of the chip card, said chart of rights associating for each of said plurality of applications, said name for said at least one data table thereof with i) said name for each of said plurality of applications, and user applications thereof, that are capable of using said at least one data table thereof and ii) a set of rights granted to said plurality of applications, and user applications thereof, which are capable of using said at least one data table thereof; and giving permission for management of data elements contained in a table of data as a function of a set of rights granted to a particular one of said plurality of applications, and user applications thereof, that will be in progress when said table of data will be used.

2. The method according to claim 1, further comprising:

recording a data table name in said chart of data tables if I) there is a successful presenting of a secret code associated with an application name and II) a memory allocation for this application permits the recording of the data table name;

recording rights for said data table name in said chart of rights if there is a successful presenting of said secrete code associated with said application name for which this table name has been recorded; and managing data elements contained in a table of data corresponding to said data table name as a function of i) an application in progress and ii) rights granted to said application in progress pertaining to said table of data.

3. The method according to claim 1, wherein said plurality of applications, and user applications thereof, are recorded in said chart of data tables.

4. The method according to claim 1, further comprising recording a table of a plurality of enciphering keys in the memory of the chip card, each of said plurality of enciphering keys being associated with one of said plurality of applications so as to permit transfer of data elements contained in a data table associated with one of said plurality of applications in an enciphered form that is a function of an enciphering algorithm parameterized by a key associated with said one of said plurality of applications.

5. The method according to claim 1, wherein said chart of applications includes, for each of said plurality of applications, a maximum number of tests of transactions with said chip card.

6. The method according to claim 1, wherein said chart of data tables includes, as a description for each of a plurality of data tables, at least one element selected from the group consisting of:

a name for that data table, a name for an application that is associated with that data table, a number of columns for that data table, a type of that data table, an addresses, in said memory of said chip card, of data elements pertaining to that data table, an address of a start of a description of a following table, and for each column of that data table, a type of that column, a length of that column and a name for that column.

7. The method according to claim 1, wherein said chart of data tables includes, for each of a plurality of data tables, one member selected from the group consisting of an application name and a column name, preceded by a number representing a number of characters of this name.

8. The method according to claim 1, wherein said chart of data tables includes a data table that is created by automatically assigning to said data table an information element representing a name for an application for which a secret code has been successfully presented.

9. The method according to claim 1, wherein said chart of rights includes a description, for each of a plurality of records of said chart of rights, at least one element selected from the group consisting of:

a name for a table, a name for an application that has obtained rights, a name for a user application that has obtained rights, and a list of rights obtained.

10. The method according to claim 1, wherein said at least one data table includes a plurality of columns pertaining to said at least one data table.

11. A method for loading a plurality of applications in a memory of a chip card, each of said plurality of applications being capable of a) including at least one user application, b) including at least one data table, c) granting at least one of a plurality of rights, to at least one of a remainder of said plurality of applications, for carrying out at least one of a plurality of commands on said at least one data table and d) granting at least one of said plurality of rights, to said at least one user application, for carrying out at least one of said plurality of commands on said at least one data table, said at least one user application not being capable of including further user applications, said at least one user application not being capable of including any data tables, said at least one user application not being capable of granting any of said plurality of rights, to any of i) said plurality of applications and ii) user applications thereof, said method comprising:

recording a chart of applications in the memory of the chip card which associates a password and a memory space with a name for i) each of said plurality of applications and ii) said at least one user application thereof;

recording a chart of data tables in the memory of the chip card, said chart of data tables including a plurality of records, each of said plurality of records associating said name for each of said plurality of applications with a name for said at least one data table thereof; and recording a chart of rights in the memory of the chip card, said chart of rights associating for each of said plurality of applications, said name for said at least one data table thereof with i) said name for each of said plurality of applications, and user applications thereof, that are capable of using said at least one data table thereof and ii) a set of rights granted to said plurality of applications, and user applications thereof, which are capable of using said at least one data table thereof.

12. The method according to claim 11, further comprising:

recording a data table name in said chart of data tables if I) there is a successful presenting of a secret code associated with an application name and II) a memory allocation for this application permits the recording of the data table name; and recording rights for said data table name in said chart of rights if there is a successful presenting of said secrete code associated with said application name for which this table name has been recorded.

13. The method according to claim 11; wherein said plurality of applications, and user applications thereof, are recorded in said chart of data tables.

14. The method according to claim 11, further comprising recording a table of a plurality of enciphering keys in the memory of the chip card, each of said plurality of enciphering keys being associated with one of said plurality of applications so as to permit transfer of data elements contained in a data table associated with one of said plurality of applications in an enciphered form that is a function of an enciphering algorithm parameterized by a key associated with said one of said plurality of applications.

15. The method according to claim 11, wherein said chart of applications includes, for each of said plurality of applications, a maximum number of tests of transactions with said chip card.

16. The method according to claim 11, wherein said chart of data tables includes, as a description for each of a plurality of data tables, at least one element selected from the group consisting of:

a name for that data table, a name for an application that is associated with that data table, a number of columns for that data table, a type of that data table, an addresses, in said memory of said chip card, of data elements pertaining to that data table, an address of a start of a description of a following table, and for each column of that data table, a type of that column, a length of that column and a name for that column.

17. The method according to claim 11, wherein said chart of data tables includes, for each of a plurality of data tables, one member selected from the group consisting of an application name and a column name, preceded by a number representing a number of characters of this name.

18. The method according to claim 11, wherein said chart of rights includes a description, for each of a plurality of records of said chart of rights, at least one element selected from the group consisting of:

a name for a table, a name for an application that has obtained rights, a name for a user application that has obtained rights, and a list of rights obtained.

19. The method according to claim 11, wherein said at least one data table includes a plurality of columns pertaining to said at least one data table.

20. A method for managing a plurality of applications in a memory of a chip card, each of said plurality of applications being capable of a) including at least one user application, b) including at least one data table, c) granting at least one of a plurality of rights, to at least one of a remainder of said plurality of applications, for carrying out at least one of a plurality of commands on said at least one data table and d) granting at least one of said plurality of rights, to said at least one user application, for carrying out at least one of said plurality of commands on said at least one data table, said at least one user application not being capable of including further user applications, said at least one user application not being capable of including any data tables, said at least one user application not being capable of granting any of said plurality of rights, to any of i) said plurality of applications and ii) user applications thereof, said method comprising:

providing a chart of applications in the memory of the chip card which associates a password and a memory space with a name for i) each of said plurality of applications and ii) said at least one user application thereof;

providing a chart of data tables in the memory of the chip card, said chart of data tables including a plurality of records, each of said plurality of records associating said name for each of said plurality of applications with a name for said at least one data table thereof;

providing a chart of rights in the memory of the chip card, said chart of rights associating for each of said plurality of applications, said name for said at least one data table thereof with i) said name for each of said plurality of applications, and user applications thereof, that are capable of using said at least one data table thereof and ii) a set of rights granted to said plurality of applications, and user applications thereof, which are capable of using said at least one data table thereof; and giving permission for management of data elements contained in a table of data as a function of a set of rights granted to a particular one of said plurality of applications, and user applications thereof, that will be in progress when said table of data will be used.

\* \* \* \* \*